(12) United States Patent
Angelhag (10) Patent No.: US 8,335,493 B2
(45) Date of Patent: Dec. 18, 2012

(54) SYSTEM AND METHOD FOR SERVICE SELECTION IN A PORTABLE DEVICE

(75) Inventor: Bo Anders Angelhag, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 638 days.

(21) Appl. No.: 11/558,527

(22) Filed: Nov. 10, 2006

(65) Prior Publication Data

US 2008/0113655 A1      May 15, 2008

(51) Int. Cl.
*H04B 5/00* (2006.01)
*G06F 15/16* (2006.01)
*G06F 15/173* (2006.01)

(52) U.S. Cl. .................... 455/414.1; 455/41.1; 709/201; 709/223

(58) Field of Classification Search .................. 235/381; 713/156, 164; 380/255, 270; 455/414.1, 455/414.2, 436, 552, 41.1; 370/310; 709/201, 709/225, 223; 379/120, 157, 201, 243
See application file for complete search history.

(56) References Cited

U.S. PATENT DOCUMENTS

| | | | |
|---|---|---|---|
| 6,604,140 | B1 | 8/2003 | Beck et al. |
| 2002/0165727 | A1* | 11/2002 | Greene et al. ............ 705/1 |
| 2006/0071778 | A1 | 4/2006 | Vesikivi et al. |
| 2006/0094405 | A1 | 5/2006 | Dupont |
| 2006/0133414 | A1 | 6/2006 | Luoma et al. |
| 2006/0217072 | A1* | 9/2006 | Poyhonen et al. ....... 455/67.11 |
| 2007/0032236 | A1* | 2/2007 | Kim et al. ................ 455/436 |
| 2008/0020707 | A1* | 1/2008 | Takayama et al. ........ 455/41.2 |
| 2008/0194294 | A1* | 8/2008 | Ryon ...................... 455/558 |
| 2008/0208925 | A1* | 8/2008 | Shum ...................... 707/202 |
| 2009/0293120 | A1* | 11/2009 | Feng et al. .............. 726/21 |

FOREIGN PATENT DOCUMENTS

EP        1 370 050      12/2003

OTHER PUBLICATIONS

International Search Report for corresponding Application No. PCT/IB2007/001207 mailed Jan. 29, 2008.
Taoufik Ghanname; "How NFC can to speed Bluetooth transactions today"; Internet Citation, Feb. 14, 2006; XP002458023; Retrieved from the Internet URL: http://www.wirelessnetdesignline.com/showArticle.jhtml?articleID-1802032.
PCT/IB2007/001207 IPRP Report dated Oct. 21, 2008.

* cited by examiner

*Primary Examiner* — George Eng
*Assistant Examiner* — Nizar Sivji
(74) *Attorney, Agent, or Firm* — Renner, Otto, Boisselle & Sklar LLP (57) ABSTRACT

A portable device for use of a service provided by a remote service system comprises a communication system and a service selection application. The communication system receives a service message from the remote service system. The service message comprises at least one service descriptor. Each of the at least one service descriptors identifies a one of at least one service provided by the remote service system. The service selection application applies at least one context rule to the at least one service descriptor to determine a selected one of the services provided by the remote service system. Applying the at least one context rule may comprise: i) identifying current context factors of the portable device; and ii) identifying a selected one of the services by identifying which of the at least one service descriptors are associated with the current context factors of the portable device. The service application then drives the communication system to exchange data with the remote service system to initiate use of the selected one of the services provided by the remote service system.

15 Claims, 4 Drawing Sheets

SYSTEM AND METHOD FOR SERVICE SELECTION IN A PORTABLE DEVICE

TECHNICAL FIELD OF THE INVENTION

The present invention relates to systems and methods for selection of a service in a portable device and, in particular, systems and methods for selecting and prioritizing remote service options for presentation and user selection.

DESCRIPTION OF THE RELATED ART

Contemporary portable devices, including mobile telephones, portable data assistants (PDAs), and other mobile electronic devices have operating systems which support operation of variety of applications beyond traditional wireless telephony applications.

Some of the most common applications now operated by portable devices include address book applications that rival those traditionally only available for desktop or notebook computer systems, email applications, photo capture applications, photo editing and viewing applications, web browsing applications, instant messaging applications, MP3 player applications, games and etc.

In addition to including operating systems which support a wide variety of applications, contemporary mobile devices further include multiple data transport systems. It is not uncommon for a mobile device to include a combination of one or more of: i) a wide area network communication system for voice and data transport via a wide area network (WAN) service provider's system—such as mobile telephone network; ii) a WiFi communication system for data transport using IP protocols via an Internet Service Provider (ISP) network or a local area network (LAN) for communication with other Wi-Fi enabled devices such as consumer electronic, computers, or computer peripherals; iii) a Bluetooth® communication system for the serial exchange of data with other Bluetooth® enabled devices; and/or iv) an infrared (e.g. IRDA) communication system for the serial exchange of data with other infrared enabled devices.

Further yet, contemporary mobile devices may include a Near Field Communication (NFC) system for reading data from NFC tags and/or exchanging data with other NFC enabled devices. One common application, or use, for an NFC system is to initiate a service with another NFC enabled device. In more detail, the NFC system is used to establish an initial communication (for example reading an NFC tag) and open another communication link for data transfer in accordance with a selected service.

For example, it has been envisioned that "smart posters" may promote a service or product and contain an NFC tag. By touching the mobile device to the NFC tag, the NFC system of the mobile device may receive a URL for a website that provides additional information or services related to the content of the poster—for example a service for booking a ticket. In another example, NFC enabled printers have been proposed. A user of a mobile device may enter a photo editing and/or viewing application executing on the mobile device and touch the NFC system of the mobile device to the NFC system of the printer. The mobile device and the printer may then open a Bluetooth® connection and transmit the photo(s) to the printer. Yet other examples of envisioned applications, or services, comprise use of NFC for initiating payments and electronic ticket issuance and redemption.

It is expected that wide spread use of these advanced mobile devices with NFC systems will prompt the growth and diversity of other NFC enabled service systems including computers, game consoles, televisions, music players, digital cameras, and service kiosks. These devices will offer a wide array of services, or applications, such as log-in, back up, synchronization, data upload/download, payments, etc.

A challenge will arise in that when the mobile device is contacted to a remote NFC system, multiple applications or services may be available. In the example of the smart poster, several URLs may be available. In the example of the NFC enabled printer, the printer may be part of a computer system of service kiosk providing other services (for example printing as provided by a traditional laser printer); high resolution photo printing; burning of a file to a CD; and other types of services commonly performed by computer peripheral systems. Multiple payment options may be available.

A typical portable device will comprise a user interface limited by size constraints. As such, the display may be small and the keyboard have a limited quantity of keys. This can make selection of one of multiple available services cumbersome.

What is needed is a system and method for operating a portable device such as a mobile telephone, PDA, or similar mobile device in a manner which facilitates selecting and initiating use of an application or service provided by a remote service system. More particularly, what is needed is a system and method for operating a portable device such as a mobile telephone, PDA, or similar mobile device in a manner which facilitates selecting and initiating use of an application or service provided by a remote service system in an environment where in the remote service system provides at least two services.

SUMMARY

A first aspect of the present invention comprises a portable device for use of a service provided by a remote service system. The portable device comprises a communication system and a service selection application. The communication system receives a service message from the remote service system. When the service system provides at least two services, the service message comprises at least two service descriptors. Each of the at least two service descriptors identifies a one of at least two services provided by the remote service system. The service selection application applies at least one context rule to the at least two service descriptors to determine a selected one of the services provided by the remote service system.

Applying at least one context rule to determine a selected one of the services provided by the remote service system may comprises: i) identifying current context factors of the portable device; and ii) identifying a selected one of the services by identifying which of the at least one services are associated with the current context factors of the portable device.

In one exemplary embodiment, identifying current context factors of the portable device may comprises identifying at least a current application state of the portable device. In which case, identifying a selected one of the services by identifying which of the at least one services are associated with the current application state of the portable device.

In another exemplary embodiment, identifying which of the at least one services are associated with the current context factors of the portable device may comprise identifying which of the at least one services are associated with the current context factors of the portable device based on association between an identification of current context factors and historical usage of the at least one services.

In either exemplary embodiment, the portable device may comprise a first communication system (such as an NFC system) and a second communication system (such as Bluetooth®, Wifi, IRDA, ect). The first communication system may receive the service message from the remote service system. The service message may further comprise identification of at least one transport option. The at least one transport option may include identification of an initiation address for initiating use of the at least one service. The service application drives the second communication system to exchange data with the remote service system by initiating a message to initiation address.

The portable device may further comprise a user interface. As such, the service selection application may, as an option, provide an indication of the selected one of the services through the user interface and obtain confirmation of the user's intent to use the selected one of the services through the user interface. If this option is implemented, the service selection application may drive the communication system to exchange data with the remote service system to initiate use of the selected one of the services provided by the remote service system only after obtaining the confirmation.

In yet another optional embodiment which is useful in a situation wherein the context rules can not conclusively identify a selected one of the services, applying at least one context rule to determine a selected one of the services provided by the remote service system may comprises: i) identifying current context factors of the portable device; and ii) identifying at least two selected services by identifying which of the service descriptors are associated with the current context factors of the portable device.

In this embodiment, the service selection would: i) apply at least one priority rule to the at least two selected services to identify a priority order; ii) provide an indication of the at least two selected services through the user interface in the priority order; and iii) obtain, through the user interface, an indication of the users selection of a selected one of the at least two selected services. In which case, the service selection application drives the communication system to exchange data with the remote service system to initiate use of the selected one of the services provided by the remote service system only after obtaining the indication of the user's selection.

In one sub-embodiment, applying at least one priority rule to the at least two selected services to identify a priority order may be based on an association between an identification of current context factors and historical usage of the services.

In another sub-embodiment, applying at least one priority rule to the at least two selected services to identify a priority order may be based on an association between the current context factors of the portable device and historical usage of the services.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The term "electronic equipment" as referred to herein includes portable radio communication equipment. The term "portable radio communication equipment", also referred to herein as a "mobile radio terminal" or "portable device", includes all equipment such as mobile phones, pagers, communicators, e.g., electronic organizers, personal digital assistants (PDAs), smart phones or the like.

Many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Table and/or database structures represented in this application are exemplary only and intended to show the mapping of relationships between various data elements. Those skilled in the art will recognize that other table and/or database structures (including an XML file) may store similar data elements in a manner that maintains the relationships useful for the practice of the present invention without departing from the scope of the present invention.

Figure 1:
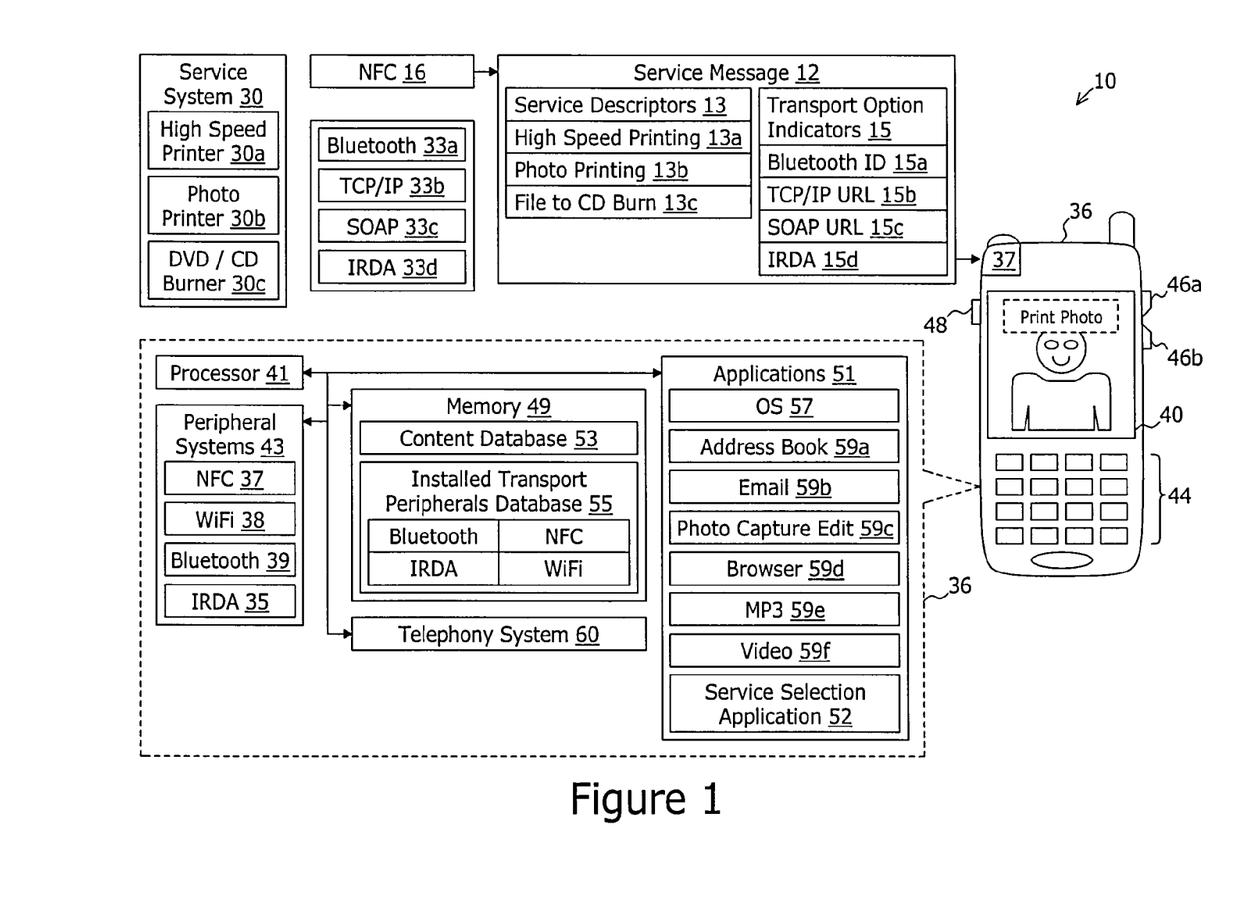
FIG. 1 is a diagram representing exemplary architecture for a system for utilizing a portable device for obtaining a service from a remote service system in accordance with one embodiment of the present invention.

With reference to FIG. 1, exemplary architecture for a system 10 for utilizing a portable device 36 to obtain services from a remote service system 30 is shown. In accordance with the exemplary system 10, the remote service system 30 may provide a plurality of applications or services to NFC enabled portable devices 36.

The applications or services may be any permutation of applications or services such as: i) a high speed printing service 30a for high speed printing of documents (for example printing as provided by a traditional laser printer); ii) a high resolution color printing service 30b for high resolution printing of photographs; iii) a DVD/CD burning service 30c for writing a data file (e.g. MP3, PDF, or any other format) to a CD or DVD; iv) a URL redirect services (not shown) for redirecting a browser on the portable device 36 to a particular URL; and/or v) various applications, or services such as log-in, synchronization, data upload/download, payments, and etc.

A Near-Field Communication device (NFC device) 16 may be coupled to the remote service system 30 (or the remote service system may include NFC device 16) as a means for communicating a service message 12 to the portable device 36. The service message 12 may include one or more service descriptors 13 and, if applicable corresponding transport option indicators 15.

In the exemplary embodiment, the remote service system 30 provides at least two services and therefore the service message 12 includes at least two service descriptors 13. Each service descriptor 13 identifies or describes a one of a plurality of services 30a-30c provided by the remote service system 30 and may identify or describe service parameters for use of the identified or described service 30a-30c. For example: i) service descriptor 13a identifies the high speed printing service 30 a and may describes parameters or use of the high speed printing service 30a; ii) service descriptor 13b identifies the high resolution color printing service 30b and may describe parameters for use of the service 30b for photo printing; and iii) service descriptor 133 identifies the DVD/CD burning service 30c and may describe parameters for use of the service 30c for writing a file to a DVD or CD.

Each transport option indicator 15 describes an available transport means 33 for accessing a one of the services 30a-30c. Transport option indicators 15 may indicate a combination of a media and an initiation address for initiating use of at least one of the services 30a-30c. For example: i) transport option indicator 15a may represent a Bluetooth ID (BD_ADDR) for enabling the portable device 36 to establish a Bluetooth connection to a compatible Bluetooth module 33a of the remote service system 30 for accessing a service 30a-30c; ii) transport option indicator 15b may represent an Internet protocol (IP) address and port number or URL for enabling the portable device 36 to establish a TCP/IP connection to a TCP/IP server 33b of the remote service system 30 for accessing a service 30a-30c; iii) transport option indicator 15c may represent an Internet protocol (IP) address and port number or URL for enabling the portable device 36 to initiate a simple object access protocol (SOAP) messaging web services session with a web services server 33c of the remote service system 30 for accessing a service 30a-30c; and iv) transport option indicator 15d may describe an infrared connection protocol, such as IRDA, for enabling the portable device 36 to initiate an IRDA connection to a compatible IRDA module 33d of the remote system 30 for accessing a service 30a-30c.

It should be appreciated that the above transport options are exemplary options. Those skilled in the art will recognize that other transport options for enabling the portable device 36 to communicate with the remote service system 30 to initiate use of a service exist and are applicable for implementation of the present invention or any other applicable transport data for obtaining the service. Further, in an example wherein the transport option indicator 15b represents an IP address and port number or URL for enabling the portable device 36 to initiate a SOAP messaging web services session with the remote service system 30, the service message 12 may further include traditional a Web Service Description Language (WSDL) document describing the schema of the XML messaging needed for accessing the service.

In the exemplary embodiments, the portable device 36 may be any of a mobile telephone (traditional or smart phone), a pager, an electronic organizer, a PDA, or any other embodiment of portable communication equipment. The portable device 36 may include a processor 41 for executing applications 51. The applications 51 may include a portable device operating system 57 and any of those applications commonly installed on contemporary portable devices such as an address book application 59a, an email application 59b, a photo capture and editing/viewing application 59c, a web browsing application 59d, an MP3 player application 59e, a video rendering application 59e for rendering of a variety of formants of video files, and various other applications such as an instant messaging application, games and etc. Further, for purposes of implementing the present invention, the applications 51 include a service selection application 52, the details of which are described herein.

The portable device 36 may further comprise various peripheral systems 43 including a near field communication (NFC) system 37. The NFC system 37 communicates with the NFC device 16 of the remote service system 30 for obtaining the service message 12. For purposes of the present invention, the NFC system 37 may be referred to as a first communication system.

The peripheral systems 43 may further comprise additional communication systems such as: i) a Wi-Fi of other short ranger IP based wireless network system 38; ii) a Bluetooth® or other short range point to point wireless communication system 39; iii) an IRDA or other point to point infrared communication system 35; and iv) other similar transport systems.

The portable device 36 may further comprise a memory 49 (which may be FLASH or other non-volatile memory) and a user interface. The memory 49 stores at least a context database 53 and an installed transport peripherals database 55, the details of which are described herein.

The user interface may include a display 40, a keypad 44, and programmable key switches which may include: i) first and second key switches 46a, 46b which are configured for use controlling volume when a mobile telephone is in an active telephony session state; and ii) an additional switch 48 which is configured for activating a digital camera or music player of a mobile telephone.

Figure 4:
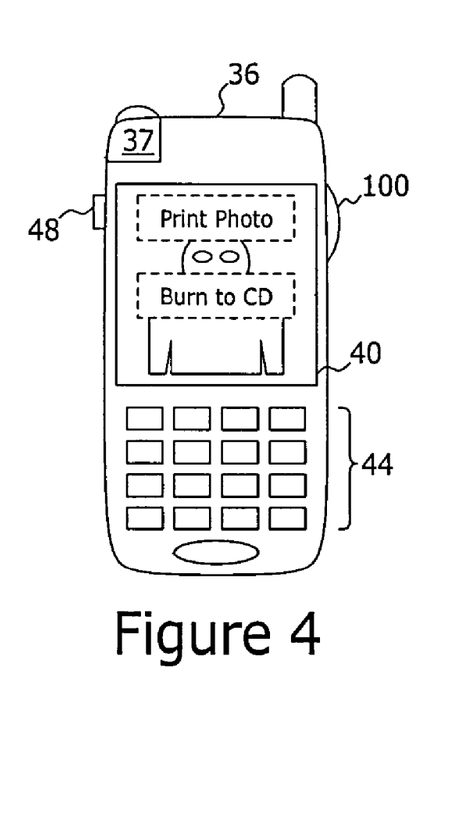
FIG. 4 is an exemplary portable device representing selection of a service in accordance with one embodiment of the present invention.

Alternatively, with brief reference to FIG. 4, the user interface may include the display 40, a keypad 44, and other programmable user interface controls such as a thumbwheel 100. The thumbwheel 100 operates in place of the key switches 46a, 46b for volume control and when the mobile telephone is in an active audio state and scrolling of transaction option indicators when the mobile telephone is conducting a transaction. The thumbwheel may also include a programmable switch activated upon depressing of the thumbwheel.

Figure 5:
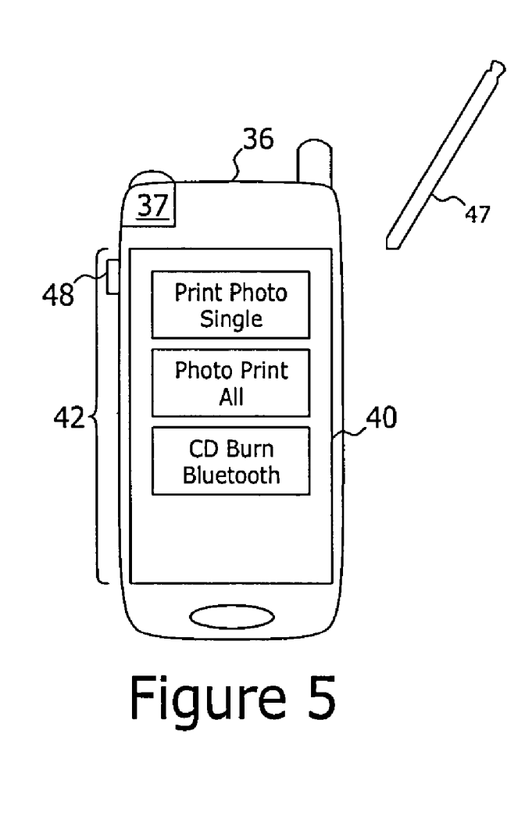
FIG. 5 is an exemplary portable device representing optional steps of selection of a service and transport option in accordance with one optional embodiment of the present invention.

As yet another alternative, with brief reference to FIG. 5, the user interface may include the display 40 and a touch sensitive panel 42 positioned as part of the display 40 (an overlay). Such, a combination of the touch sensitive panel 42 and a stylus 47 may operate in place of the key switches.

Returning to FIG. 1, in operation the portable device 36 receives the service message 12 from the remote service system 30. A service selection application 52 selects a one of the plurality of available services 30a-30c by determining context factors of the portable device 36 and applying at least one context rule.

Figure 2:
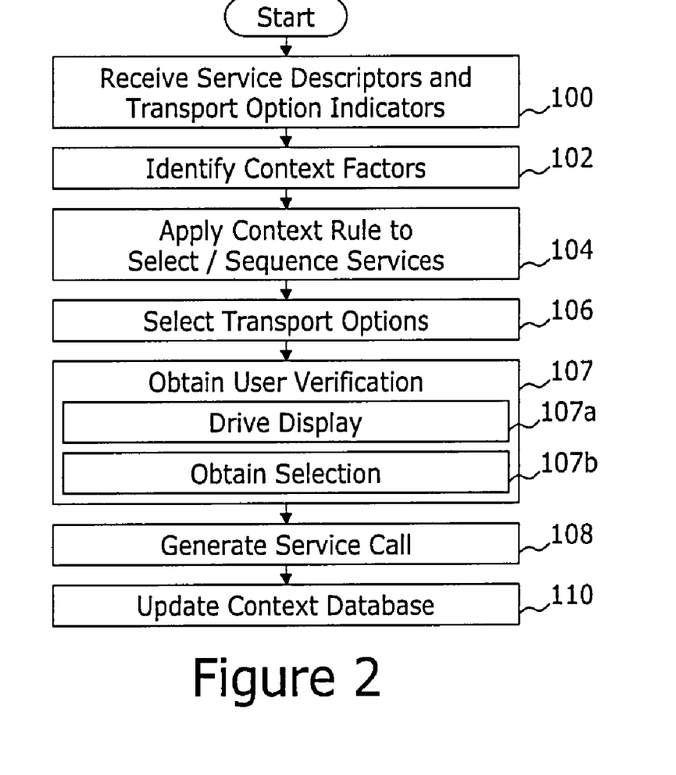
FIG. 2 is a flow chart representing exemplary operation of a service selection application in accordance with one embodiment of present invention.

Turning to FIG. 2 in conjunction with FIG. 1, exemplary operation of the service selection application 52 is shown. Upon the NFC system 37 receiving a service message 12 from the NFC system 16 of a remote service system 30, the service descriptors 13 and transport options 15 of such service message 12 are passed to the service selection application 52 as represented by step 100.

Step 102 represents the service selection application 52 identifying current context factors for use in selecting a one of the multiple services 30 (or sequences multiple services for selection by the operator).

Figure 3A:
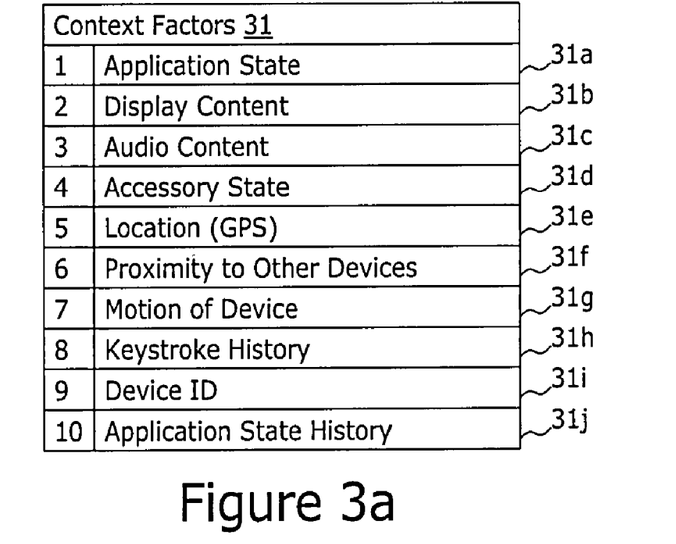
FIG. 3a is a table representing exemplary context factors in accordance with one embodiment of the present invention.

Turning briefly to FIG. 3a in conjunction with FIGS. 1 and 2, exemplary current context factors 31 may comprise: i) an application state factor 31a; ii) a display content factors 31b; iii) an audio content factor 31c; iv) an accessory state factor 31d; v) a device location factor 31e; vi) a proximity factor 31f (proximity to other devices); vii) a motion factor 31g (motion of the device 36); viii) a keystroke history factor 31h; ix) a device ID factor 31i; and x) an application state history factor 31j. Therefore, step 102 may comprise identifying each of such contact factors 31a-31j based on the then current state of the device 36. For example, identifying the application state factor 31a may comprise identifying which of applications 59a-59f are currently active on the portable device 36.

Identifying the display content factor 31b may comprise identifying which of the applications 59a-59f is driving the content of the display 40 and the media content of the display 40. For example, if the photo capture edit application 59c is driving the display content, the media content may be a single photo or multiple photos.

Identifying the audio content factor 31c may comprise identifying which of the applications 59a-59f is driving the content of the audio output of the device 36. For example, the MP3 application 59e may be active and driving audio output or, in the alternative, the MP3 application may be active, but the telephony system 60 is driving the audio output.

Identifying the accessory state factor 31d may comprise determining which, if any, accessories are coupled to the device 36 and determining the I/O content of such accessories. For example, is audio output through internal speaker or headset.

Identifying the location factor 31e may comprise determining the location of the device 36 using a GPS system.

Identifying the proximity factor 31f may comprise identifying other devices within communication range of the device 36 by, for example, initiating a Bluetooth inquiry scan.

Identifying a motion factor 31g may comprise obtaining data from an internal motion sensor. For example, if the device 36 is used as a "virtual pen" for enabling the user to draw a signature, identifying a motion factor 31g may include obtaining an indication that the user drew a signature and obtaining the data points representing the signature. As another example, the motion factor 31g may comprise identification of a position in which the device 36 is held such that if held in a first position (display side up) the motion factor may be used for selection of a first service and if held in a second position (display side down) the motion factor may be used for selection of a second service. This enables the user to select from multiple known services in a convenient manner simply by how the user positions the device 36 when contacting the NFC system of the remote service system 30. Other motion factors 31g may include acceleration and direction of movement.

Identifying a keystroke history factor 31h may comprise obtaining a tracking of keystroke history in each active application.

Identifying a device ID factor 31i may comprise obtaining the device ID and/or a user ID associated with the portable device 36 whereby historical usage of services by the user of the particular device may be ascertained.

Identifying an application state history factor 31j may comprise obtaining a sequence in which applications were historically active, were driving the user interface, were driving output of the display 40, and/or were driving audio output.

Step 104 represents applying a context rule to select a one of the services 33 provided by the remote service system 30 and/or applying a context based priority rule to sequence a listing of a plurality of services 33 provided by the remote service system 30 for user selection of a one of the services 33. In more detail, the service selection application 52 maintains a context database 53 which may be used for selecting (or sequencing) the service(s) 30a-30c provided by the remote service system 30 based on identifying a service 30a-30c (or services) that is (or are) matched with the identified context factors 31.

Figure 3B:
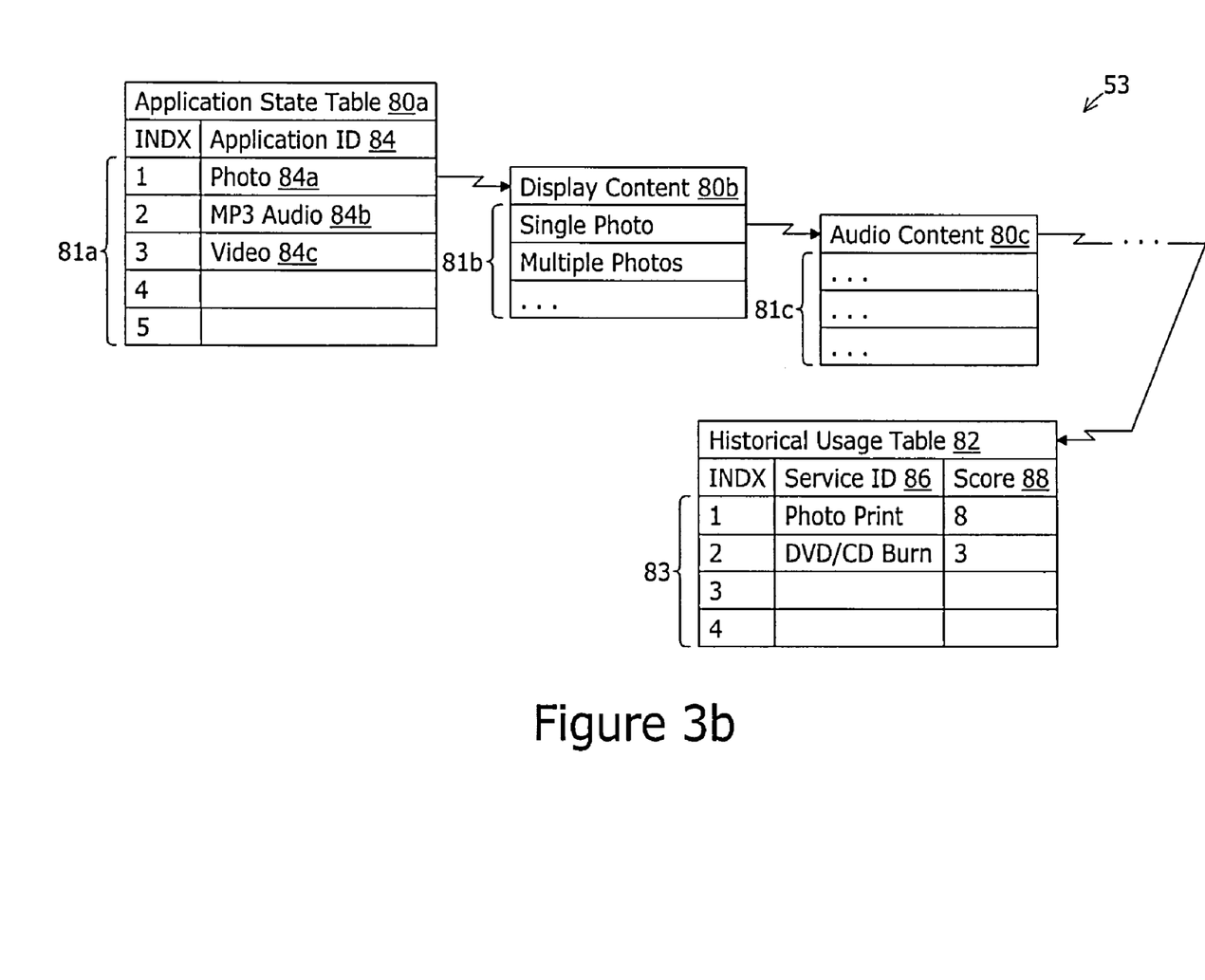
FIG. 3b is a an exemplary context database for operation with the selection application in accordance with one embodiment of the present invention.

Turning briefly to FIG. 3b in conjunction with FIGS. 1 and 2, an exemplary embodiment of a portion of the context database 53 is shown. Those skilled in the art will appreciate that the structure represented by FIG. 3 is and exemplary system for implementing the context based selection, or sequencing, of services or applications available form a remote service provider 30. Other database structures (including an XML file) may be chosen for implementing similar data interrelations and/or similar selection functions without departing from the scope of the present invention.

The context rule database 53 may comprise a plurality of nested tables 80a-80i, each comprising data to which the context factors 31 determined at step 102 relate, and a historical usage table 82. The service category history table 82 includes listing of known services which related to the current context factors 31 as determined by the interrelated tables 80a-80i.

For example, the application state table 80a includes a plurality of records 81a. Each record 81a represents one of the possible application state factors that may be determined at step 102. Application state 84a represents an application state wherein the photo capture and viewing/editing application 59c is active. Application state 84b represents an application state wherein the MP3 audio application 59e is active. Application state 84c is an application state wherein a video application 59f is active.

Linked with each record of the application state table 80a is a display content table 80b includes a plurality of records 81b, each of which represents possible display contents when the device 36 is in the particular application state with which the display content table 80b is linked. For example, when the device 36 includes the photo capture editing/viewing application 59c active, the display contents may be a single photo or multiple photos as represented by records 81b.

The process of sequentially evaluating each of the context factors to select a record in each of the nested context tables 80a-80i results in selection of a particular historical usage table 82. The historical usage table 82 includes a plurality or records 83. Each record associates a known service (or category of services) which related to each of the context factors 31) as determined by the interrelated nested context tables 80a-80i) with a usage score 88. Application of the context rule may include selection of a single service by selection of the service with the highest usage score. Application of the priority rule for sequencing of services may by sequencing in an order based on the usage score.

In one exemplary embodiment, each historical usage score value 88 may be a value which represents the number of times the service was used when the portable device 36 was previously in the same or similar context state.

Returning to FIG. 2 in conjunction with FIG. 1, step 106 represents selecting a one of the transport options that the remote service system 30 has available for the selected service. In more detail, the service selection application 52 selects the transport options provided by the remote service system 30 (each identified by a transport option indicator 15) based on identifying a transport option (or transport options) that are available to the portable device 36 (e.g. a peripheral systems supporting the transport option is installed and available for use on the portable device 36).

In more detail, the installed transport peripherals database 55 may include a listing of transport option peripherals which are installed and available for use on the portable device 36. As such, step 106 may comprise: i) selecting those transport option indicators 15 (from the service message 12) which match a transport option peripheral listed in the transport peripherals database 55 as represented by step 106*a*; and ii) if multiple transport option peripherals could be used, either selection of transport option based on secondary criteria (such as fastest data rate) or sequence of transport options for user selection as represented by step 106*b*.

Referring briefly to FIG. 5 in conjunction with FIG. 1, user selection of a transport option may comprise the service selection application 52 sequencing the transport options for display in conjunction with the indicators of the compatible services on the display screen 40 for user selection and/or verification.

Returning to FIG. 2, step 107 obtaining confirmation of the user's intent to initiate use of the selected one of the services or, if multiple services are listed in a priority order, obtaining use selection of the service the user intends to initiate. In more detail, step 107*a* may represent driving display of the selected service (or the priority sequence of services) on the display 40. Step 107*b* represents detecting user selection my means of the key switches 46*a*, 46*b*, thumbwheel 100 (FIG. 4), or touch sensitive panel 42 (FIG. 5).

Step 108 represents the service selection application 52 generating a service call to the remote service system 30 for the selected service (identified by the service descriptor 13) using the selected transport option by initiating a message to the initiation address includes in the transport option indicator 15 of the selected transport option.

Step 110 represents the service selection application 52 updated the context database 53 to reflect usage of the selected service. Updating the contest database 53 may comprise updating historical usage score value 88 of the historical usage table 82 which is associated with the then current application state of the portable device 36.

It should be appreciated that the systems and methods of the present invention provide a convenient system for selecting amongst multiple services that may be provided by a remote service provider system and selection amongst multiple transport options for initiating use of the selected service. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A portable device for use of a service provided by a remote service system, the portable device comprising:
 a first communication system in the portable device for receiving a service message via near field communication from the remote service system, the service message comprising at least one service descriptor, each of the at least one service descriptors identifying a service provided by the remote service system and further identifying at least one transport option, the at least one transport option including an identification of an initiation address for initiating use of the at least one service;
 a second non near field communication system in the portable device for exchanging data with the remote service system; and
 a service selection application adapted to:
 apply at least one context rule to determine a selected one of at least two services provided by the remote service system, wherein applying at least one context rule to determine a selected one of the services provided by the remote service system comprises:
 identifying current context factors of the portable device and identifying at least two selected services by identifying which of the service descriptors are associated with the current context factors of the portable device;
 apply at least one priority rule to the at least two selected services to identify a priority order,
 provide an indication of the at least two selected services through a user interface in the priority order, and
 obtain, through the user interface, an indication of the user's selection of a selected one of the at least two selected services; and
 after obtaining the indication of the user's selection, drive the second communication system to exchange data with the remote service system to initiate use of the selected one of the services provided by the remote service system by initiating a message to the initiation address.

2. The portable device of claim 1, wherein:
 the service message comprises at least two service descriptors, each of the at least two service descriptors identifying a one of at least two services provided by the remote service system; and
 the service selection application applies that at least one context rule to determine a selected one of the at least two services provided by the remote service system.

3. The portable device of claim 1, wherein:
 identifying current context factors of the portable device comprises identifying at least a current application state of the portable device; and
 identifying a selected one of the services by identifying which of the at least one service descriptors are associated with the current context factors of the portable device comprises identifying a selected one of the services by identifying which of at least one service descriptors are associated with the current application state of the portable device.

4. The portable device of claim 3, wherein identifying current context factors of the portable device further comprising identifying at least one additional context factor selected from a group of context factors consisting of: i) a display content factor; ii) an audio content factor; iii) accessory state factor; iv) a device location factor; v) proximity to other devices factor; vi) a device motion factor; vii) a keystroke history factor; and viii) a device ID factor.

5. The portable device of claim 1, wherein identifying a selected one of the services by identifying which of the at least one service descriptors are associated with the current context factors of the portable device comprises identifying which of the at least one service descriptors are associated with the current context factors of the portable device based on association between an identification of current context factors and historical usage of the at least one services.

6. The portable device of claim 5, wherein identifying current context factors of the portable device further comprising identifying at least one additional context factor selected from a group of context factors consisting of: i) a display content factor; ii) an audio content factor; iii) accessory state factor; iv) a device location factor; v) proximity to other devices factor; vi) a device motion factor; vii) a keystroke history factor; and viii) a device ID factor.

7. The portable device of claim 1, wherein applying at least one priority rule to the at least two selected services to identify a priority order is based on an association between an identification of current context factors and historical usage of the services.

8. The portable device of claim 1, wherein:
identifying the at least two selected services comprises identifying which of the service descriptors are associated with the current context factors of the portable device based on an association between an identification of current context factors and historical usage of the services; and
applying at least one priority rule to the at least two selected services to identify a priority order is based on an association between an identification of current application state and historical usage of the at least two selected services.

9. A method of operating a portable device for use of a service provided by a remote service system, the method of operating the portable device comprising:
receiving at a portable device a service message from the remote service system via a first near field communication system in the portable device, the service message comprising at least one service descriptor, each of the at least one service descriptor identifying a service provided by the remote service system and further identifying at least one transport option, the at least one transport option including an identification of an initiation address for initiating use of the at least one service;
applying at least one context rule to determine a selected one of at least two services provided by the remote service system, wherein applying at least one context rule to determine a selected one of the services provided by the remote service system comprises:
identifying current context factors of the portable device, and
identifying at least two selected services by identifying which of the service descriptors are associated with the current context factors of the portable device;
applying at least one priority rule to the at least two selected services to identify a priority order,
providing an indication of the at least two selected services through a user interface in the priority order, and
obtaining, through the user interface, an indication of the user's selection of a selected one of the at least two selected services; and
after obtaining the indication of the user's selection, driving a second non-near field communication system in the portable device to exchange data with the remote service system to initiate use of the selected one of the services provided by the remote service system by initiating a message to the initiation address.

10. The method of claim 9, wherein:
the service message comprises at least two service descriptors, each of the at least two service descriptors identifying a one of at least two services provided by the remote service system; and
applying at least one context rule to determine a selected one of the services provided by the remote service system comprises applying at least one context rule to determine a selected one of the at least two services provided by the remote service system.

11. The method of claim 9, wherein
identifying current context factors of the portable device comprises identifying at least a current application state of the portable device; and
identifying a selected one of the services by identifying which of the at least one service descriptors are associated with the current context factors of the portable device comprises identifying a selected one of the services by identifying which of at least one service descriptors are associated with the current application state of the portable device.

12. The method of claim 11, wherein identifying current context factors of the portable device further comprising identifying at least one additional context factor selected from a group of context factors consisting of: i) a display content factor; ii) an audio content factor; iii) accessory state factor; iv) a device location factor; v) proximity to other devices factor; vi) a device motion factor; vii) a keystroke history factor; and viii) a device ID factor.

13. The method of claim 9, wherein identifying a selected one of the services by identifying which of the at least one service descriptors are associated with the current context factors of the portable device comprises identifying which of the at least one service descriptors are associated with the current application state of the portable device based on association between an identification of current context factors and historical usage of the at least one services.

14. The method of claim 13, wherein identifying current context factors of the portable device further comprising identifying at least one additional context factor selected from a group of context factors consisting of: i) a display content factor; ii) an audio content factor; iii) accessory state factor; iv) a device location factor; v) proximity to other devices factor; vi) a device motion factor; vii) a keystroke history factor; and viii) a device ID factor.

15. The method of claim 9, wherein:
identifying the at least two selected services comprises identifying which of the service descriptors are associated with the current context factors of the portable device based on an association between an identification of current context factors and historical usage of the services; and
applying at least one priority rule to the at least two selected services to identify a priority order is based on an association between an identification of current application state and historical usage of the at least two services.

* * * * *